(12) United States Patent
Sharma

(10) Patent No.: US 7,051,166 B2
(45) Date of Patent: May 23, 2006

(54) DIRECTORY-BASED CACHE COHERENCY SCHEME FOR REDUCING MEMORY BANDWIDTH LOSS

(75) Inventor: Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 10/419,477

(22) Filed: Apr. 21, 2003

(65) Prior Publication Data

US 2004/0210722 A1    Oct. 21, 2004

(51) Int. Cl.
*G06F 13/18* (2006.01)
*G06F 9/28* (2006.01)

(52) U.S. Cl. ...................... 711/150; 711/144
(58) Field of Classification Search ............... 711/150, 711/144
See application file for complete search history.

(56) References Cited

U.S. PATENT DOCUMENTS

| | | | |
|---|---|---|---|
| 5,113,500 A * | 5/1992 | Talbott et al. ............. 710/305 |
| 5,249,284 A | 9/1993 | Kass et al. |
| 5,313,609 A | 5/1994 | Baylor et al. |
| 5,737,757 A | 4/1998 | Hassoun et al. |
| 5,860,153 A | 1/1999 | Matena et al. |
| 5,974,564 A * | 10/1999 | Jeddeloh ......................... 714/8 |
| 5,991,819 A * | 11/1999 | Young ........................ 709/253 |
| 6,073,216 A * | 6/2000 | McDonald et al. ......... 711/141 |
| 6,088,770 A | 7/2000 | Tarui et al. |
| 6,260,127 B1 * | 7/2001 | Olarig et al. ............... 711/167 |
| 6,374,332 B1 | 4/2002 | Mackenthun et al. |
| 6,415,364 B1 * | 7/2002 | Bauman et al. ............ 711/155 |
| 6,438,659 B1 | 8/2002 | Bauman et al. |
| 6,480,927 B1 | 11/2002 | Bauman |
| 6,493,843 B1 | 12/2002 | Raynham |
| 2004/0022094 A1 * | 2/2004 | Radhakrishnan et al. ... 365/200 |

FOREIGN PATENT DOCUMENTS

EP          1278123 A1 *   1/2003
JP        10320279 A   *  12/1998

* cited by examiner

*Primary Examiner*—B. James Peikari (57) ABSTRACT

A memory system employing a directory-based cache coherency scheme comprises a memory unit, a data bus, a plurality of information buses, and a memory controller. The memory unit comprises a plurality of memory modules storing a plurality of cache lines, with each cache line comprising a plurality of data bits and an associated plurality of informational bits. The data bus is coupled to each of the memory modules and is configured to read/write data from/to the memory modules. One information bus of the plurality of information buses is coupled to each of the memory modules and is configured to read/write informational bits to/from the memory modules.

23 Claims, 7 Drawing Sheets

DIRECTORY-BASED CACHE COHERENCY SCHEME FOR REDUCING MEMORY BANDWIDTH LOSS

THE FIELD OF THE INVENTION

The present invention relates generally to computer systems and more particularly to computer systems utilizing a memory hierarchy and employing a directory-based cache coherency system.

BACKGROUND OF THE INVENTION

The speed and performance of microprocessors are continuously being enhanced and have generally outpaced improvements to the speed and performance of the main memories of computer systems. As a result, a system's main memory is not always able to keep up with the demands of high-speed processors. This is especially true of multi-processor or distributed computer systems, which can provide a substantial increase in performance over traditional single processor systems by utilizing a plurality of processors to perform parallel processing. As more and higher speed processors are added to multiprocessor systems and compete for access to the main memory, memory access times for processors generally increases. Consequently, the main memory bandwidth has transformed into a significant bottleneck for high performance data processing systems.

One common technique utilized to alleviate this bottleneck is employing a memory hierarchy. For example, a three-tiered memory can be constructed from low, medium, and high speed memories. A low speed memory may be a magnetic disk for low cost bulk storage of data. A medium speed memory may be constructed from Dynamic Random Access Memory (DRAM) for use as a computer system's main memory. A high speed memory may employ Static Random Access Memory (SRAM) for use as a processor cache memory. The theory behind a memory hierarchy is to group instructions and data to be used by the system processor in the highest speed memory. Such high speed memory is typically the most expensive memory available, so economics dictate that it be relatively small.

During operation, a system processor transfers instructions and data from the system's lower speed main memory to the higher speed cache memory so that the processor can have quick access to variables of a currently executing program. Cache systems typically transfer data in blocks of data referred to as cache lines. As the processor requires additional data not contained in the cache memory, cache lines containing such data is transferred from the main memory and replaces selected cache lines in the cache memory. Various techniques or algorithms are utilized to determine what data is replaced. Since data contained in the cache memory is duplicative of data in the main memory, changes to data in one memory must be similarly changed or noted in the other memory. For example, if the data in the cache memory is modified, the corresponding data in the main memory must be similarly modified. The problem of maintaining consistency between the cache data and the main memory data is referred to as maintaining cache coherency.

One conventional technique for maintaining cache coherency, particularly in distributed systems, is a directory-based cache coherency scheme. Directory-based coherency schemes utilize a centralized tag directory to record the location and the status of cache lines as they exist throughout the system. For example, the directory records which processor caches have a copy of the data, and further records if any of the caches have an updated copy of the data. When a processor makes a cache request to the main memory for a data item, the central directory is consulted to determine where the most recent copy of the data resides. Based on this information, the most recent copy of the cache line is retrieved so that it may be provided to the requesting processor cache memory. The central tag directory is then updated to reflect the new status for that cache line. Thus, each cache line read by a processor is accompanied by a tag directory update (i.e., a write).

While directory-based cache coherency schemes assist in building scalable multi-processor systems, the updating of the tag directory associated with the nearly continuous transfers of cache lines between the main memory and cache memories wastes valuable memory bandwidth. A typical example conventional computer system tag update results in approximately a 50% loss in the bandwidth of the main memory. The loss of bandwidth associated with a tag directory update, however, varies depending on the cache line size employed by the system, the memory technology adopted, the error correction code (ECC) scheme used, and the tag directory layout in the main memory. Many computer systems, particularly distributed systems, would benefit from a directory-based cache coherency scheme that reduces main memory bandwidth loss associated with tag directory updates.

SUMMARY OF THE INVENTION

One aspect of the present invention provides a memory system employing a directory-based cache coherency scheme. The memory system comprises a memory unit, a data bus, a plurality of information buses, and a memory controller. The memory unit comprises a plurality of memory modules storing a plurality of cache lines, with each cache line comprising a plurality of data bits and an associated plurality of informational bits. The data bus is coupled to each of the memory modules and is configured to read/write data from/to the memory modules. One information bus of the plurality of information buses is coupled to each of the memory modules and is configured to read/write informational bits to/from the memory modules. The memory controller controls access to the memory unit and is configured to read a first cache line from a first memory module via the data bus and a first information bus, and in a parallel operation to write a set of updated informational bits for a previously read second cache line to a second memory module via a second information bus.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
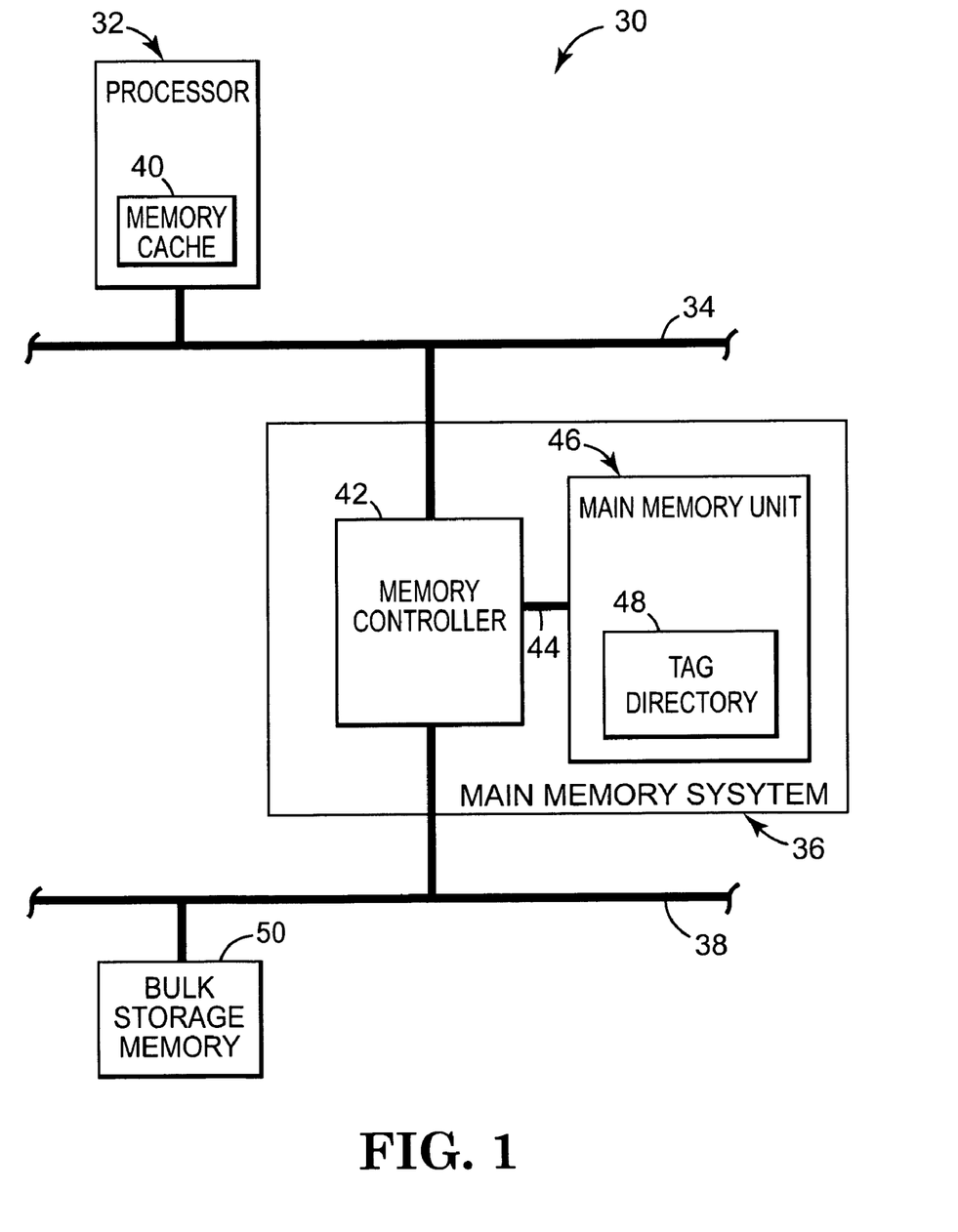
FIG. 1 is a block and schematic diagram illustrating one embodiment of a computer system according to the present invention.

FIG. 1 illustrates generally in block diagram form a portion of one embodiment of a computer system 30 utilizing a memory hierarchy and employing a directory-based cache coherency scheme. Computer system 30 includes a processor 32 coupled to a bus 34, a main memory system 36 coupled between bus 34 and a bus 38, and a non-volitile bulk storage memory 50 coupled to bus 38. In one embodiment, bulk storage memory 50 comprises a magnetic disk. Processor 32 includes a memory cache 40 for high-speed microprocessor memory accesses. Memory cache 40 is commonly known as a level one (L1) cache and typically comprises a high speed memory operating at the speed of processor 32, such as SRAM. Main memory system 36 includes a memory controller 42 coupled via a link 44 to a main memory unit 46, with main memory unit 46 further including a tag directory 48. Main memory unit 46 is commonly known as a level two (L2) cache and typically comprises a DRAM device.

During start-up of computer system 30, data from non-volatile bulk storage device 50 (i.e., a magnetic disk) is transferred to main memory unit 46. As an example, memory controller 42 transfers data from magnetic disk 50 to memory unit 46 via data bus 38 and link 44. Processor 32 selects data from main memory unit 46 to be transferred into cache memory 40 for execution. Data from main memory unit 46 is transferred to cache memory 40 in a system-defined block of data known as a cache line. Because memory cache 40 can hold only a fraction of the data in memory unit 50, processor 32 is continuously replacing cache lines being held in memory cache 40 with new cache lines from memory unit 46. Cache lines that are written from main memory unit 46 to memory cache 40 reside in both locations until such cache lines are replaced with new cache lines from memory unit 46. During the time when cache lines reside in both memory cache 40 and memory unit 46, modifications to such cache lines in either location raises cache coherency issues as discussed previously. If processor 32 modifies a cache line in cache memory 40, a corresponding modification must also be made to the cache line in main memory unit 46.

As discussed in the Background Section of the present specification, one technique for maintaining cache coherency is a directory-based cache coherency scheme. Directory-based cache coherency schemes utilize a centralized tag directory, such as tag directory 48, within the main memory unit, such as main memory unit 46, to record the status and location of cache lines as they exist throughout the system. Tag register 48 comprises a plurality of addressable locations, with each addressable location corresponding to a cache line and containing information as to where copies of the cache line exist in the system and which, if any, are updated copies of the data.

For example, when processor 32 requests a cache line (read or write) from main memory unit 36, memory controller 42 performs a read of the requested cache line, along with its corresponding directory tag, and determines whether the cache line can be sent to processor 32. If the data can be sent to processor 32, memory controller 42 transmits the data to cache memory 40 via link 44 and bus 34, and makes processor 32 an "owner" of the cache line. Controller 42 then writes back to main memory unit 46 via link 44 to store the new ownership information in tag directory 48. Hence, each read of a cache line from main memory unit 46 to cache memory 40 is accompanied by memory controller 42 writing back to main memory 46 to update the corresponding cache line tag in tag directory 48.

While a conventional main memory system employing a directory-based cache coherency scheme is effective at maintaining cache coherency, coherency is achieved at the expense of a reduction in bandwidth of main memory system 36. Each time memory controller 42 is updating tag directory 48 via link 44 for a previously read first cache line, it is prevented from reading a second cache line requested by processor 32. In one embodiment, computer system 30 utilizes a main memory system 36 that employs a directory-based cache coherency scheme according to the present invention that reduces memory system bandwidth loss by allowing the memory controller to simultaneously read a first cache line and update a directory tag of a previously read second cache line.

Figure 2:
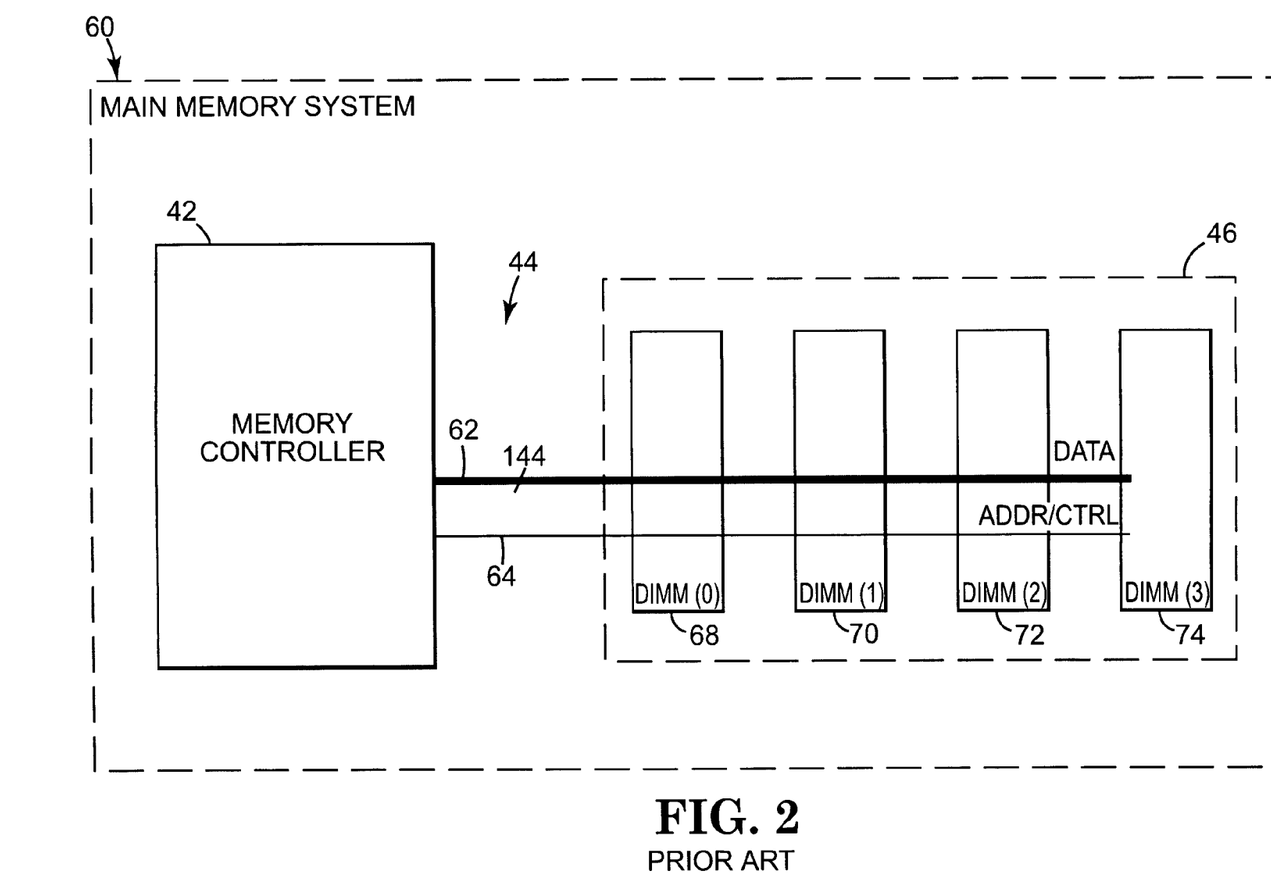
FIG. 2 is a block and schematic diagram illustrating a conventional main memory system employing a directory-based cache coherency scheme.

FIG. 2 is a block and schematic diagram illustrating an example of a conventional main memory system 60 employing a directory-based cache coherency scheme. Main memory system comprises memory controller 42, link 44, and main memory unit 46. Link 44 comprises a 144-bit wide data bus 62 and an address/control bus 64. Main memory unit comprises a first, second, third, and fourth dual in-line memory module (DIMM) labeled respectively as 66, 68, 70 and 72, with each of the four DIMMS being coupled to data bus 62 and address/control bus 64. In this example embodiment, assume that each DIMM further comprises 36 4-bit wide double-data rate (DDR) random access memory (RAM) modules, with 32 of the RAMs dedicated to storing data bits and 4 dedicated to storing "informational" bits such as tag directory bits and error correction code (ECC) bits. Also in this example embodiment, assume that memory system 60 has a system-defined cache line comprising 128-bytes. In this configuration, 4 cycles are required to transfer a cache line from memory unit 46. Depending on how the directory tag bits and ECC bits are arranged, it may take up to 4 cycles for memory controller 42 to update the tag directory bits.

Figure 3A:
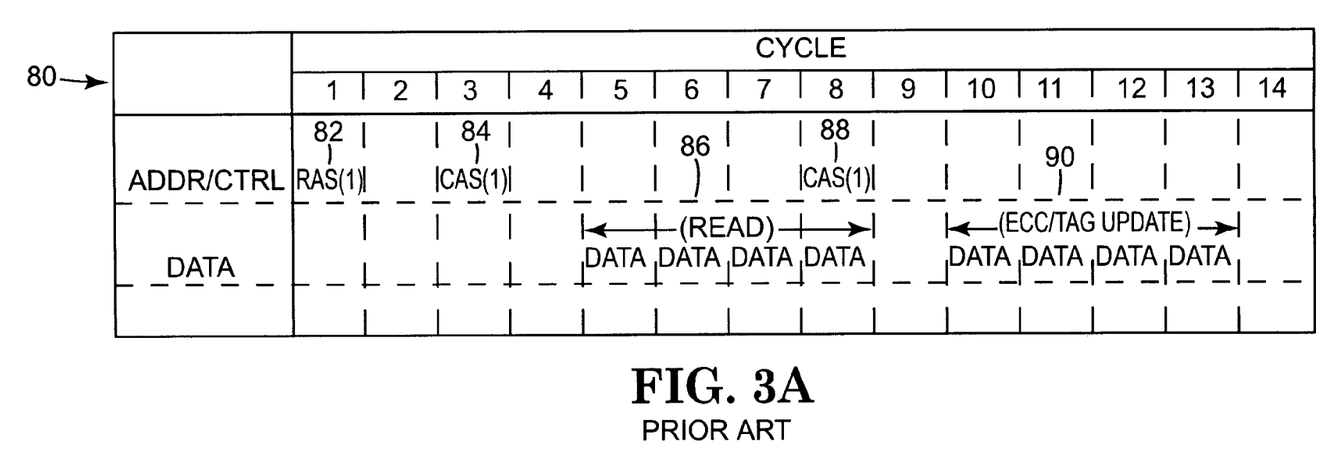
FIG. 3A is an example timing diagram illustrating the operation of a conventional main memory system employing a directory-based cache coherency scheme.

FIG. 3A is an example timing diagram 80 illustrating the operation of the example conventional main memory system 60 of FIG. 2 when transferring a cache line from memory unit 46 to cache memory 40. When processor 32 requests a cache line from memory unit 46, memory controller 42 at cycle 1 provides an enable signal to the appropriate DIMM and a first row address signal (RAS(0)) associated with the requested cache line to memory unit 46 via address/control bus 64 as indicated at 82. In this illustrative example, assume the requested cache line is held in first DIMM(0) 68. After first DIMM(0) 68 initializes the appropriate row address during cycle 2, memory controller 42 provides a first column address signal (CAS(0)) associated with the requested cache line via address/control bus 64 during cycle 3 as indicated at 84. After first DIMM (0) 68 initializes the appropriate column address during cycle 4, and assuming the memory system 36 employs an efficient memory access scheme such as burst-length 4 (BL4), memory controller 42 reads the requested cache line and its associated tag and ECC bits during cycles 5–8 as indicated at 86.

At cycle 8, as indicated at 88, memory controller 42 reinitiates CAS(0). While first DIMM(0) 68 reinitializes the appropriate column address during cycle 9, memory controller 42 modifies the directory tag and recalculates the ECC bits for the requested cache line previously read during cycles 5–8. During cycles 10–13, as indicated at 90, memory controller writes the modified ECC and directory tag bit back to memory unit 46. In other words, during cycles 10–13, memory controller 42 updates the ECC and directory tag bits for the requested cache line. As can be seen from example timing diagram 80, the cache line read and ECC/tag update are serial operations. While memory controller 42 performs the ECC/tag update during cycles 9–13, data cannot be read from memory unit 46 via data bus 62, thus resulting in a reduction in the bandwidth of memory system.

Figure 3B:
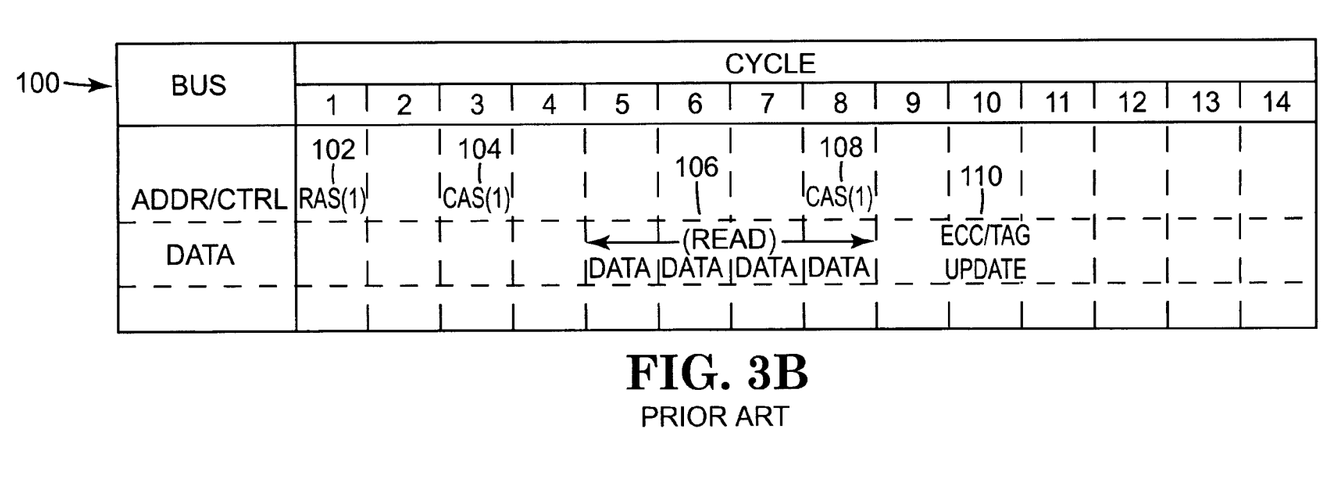
FIG. 3B is an example timing diagram illustrating the operation of a conventional main memory system employing a directory-based cache coherency scheme.

FIG. 3B is an example timing diagram 90 illustrating the operation of one embodiment of the example conventional main memory system 60 of FIG. 2, wherein the RAMs of each DIMM are not segregated into those storing data bits and those storing informational bits. In this embodiment, the RAMs are configured in such a way that ECC and directory tag bits for a requested cache line can be updated in one cycle. When processor 32 requests a cache line from memory unit 46, memory controller 42 at cycle 1 provides the enable signal to the appropriate DIMM and RAS(0) associated with that particular cache line to memory unit 46 via address/control bus 64 as indicated at 102. As in the prior example, assume the requested cache line is held in first DIMM(0) 68. After first DIMM(0) 68 initializes the appropriate row address during cycle 2, memory controller 42 provides CAS(0) associated with the requested cache line via address/control bus 64 during cycle 3 as indicated at 104. After first DIMM(0) 68 initializes the appropriate column address, memory controller 42 reads the requested cache line and its associated ECC and tag directory bits during cycles 5–8 as indicated at 106.

At cycle 8, as indicated at 108, memory controller 42 reinitiates CAS(0). While first DIMM(0) 68 reinitializes the appropriate column address during cycle 9, memory controller 42 modifies the directory tag and recalculates the ECC bits for the requested cache line previously read during cycles 5–8. During cycles 10, as indicated at 110, memory controller 42 writes the updated tag and recalculated ECC bits back to memory unit 46. In other words, during cycle 10, memory controller 42 updates the ECC and tag directory bits for the requested cache line. While this example embodiment reduces memory bandwidth loss of data bus 62 from five cycles to two cycles as compared to the example embodiment of FIG. 3A, memory bandwidth is nonetheless lost during cycles 9–10 at 110.

Figure 4:
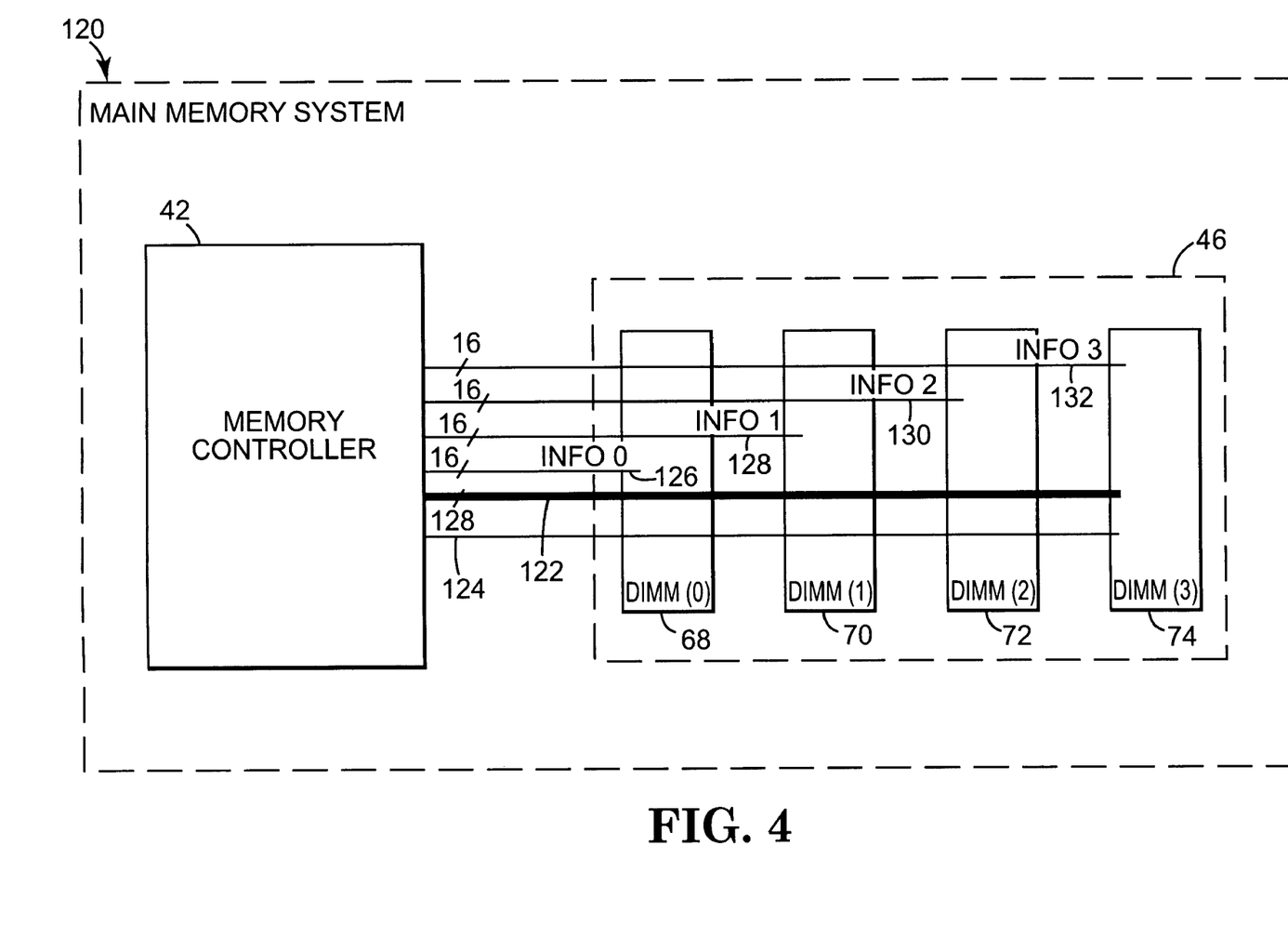
FIG. 4 is a block and schematic diagram illustrating one embodiment of a main memory system employing a directory-based cache coherency scheme according to the present invention.

FIG. 4 is a block and schematic diagram of one example embodiment of a main memory system 120 employing a directory-based cache coherency scheme according to the present invention. Main memory system 120 includes memory controller 42, main memory unit 46, a 128-bit wide data bus 122, and an address/control bus 124. Main memory unit 46 further comprises first, second, third, and fourth DIMMs 68, 70, 72 and 74, respectively, with each of the four DIMMs being coupled to memory controller 42 via data bus 122 and address/control bus 124. In contrast to the conventional main memory system 60 of FIG. 2, main memory system 120 of the present invention further includes four 16-bit wide information buses, one coupled between each DIMM 68, 70, 72 and 74 and memory controller 42 as indicated at 126, 128, 130 and 132. In the example embodiment, each DIMM further comprises 36 4-bit wide (DDR) RAMs, with 32 RAMs dedicated to data storage and 4 RAMs dedicated to storing informational bits, such as tag directory bits and/or ECC bits. Also in the example embodiment, assume main memory system 120 has a system-defined cache line comprising 128-bytes and that it employs a BL4 memory access scheme.

Figure 5:
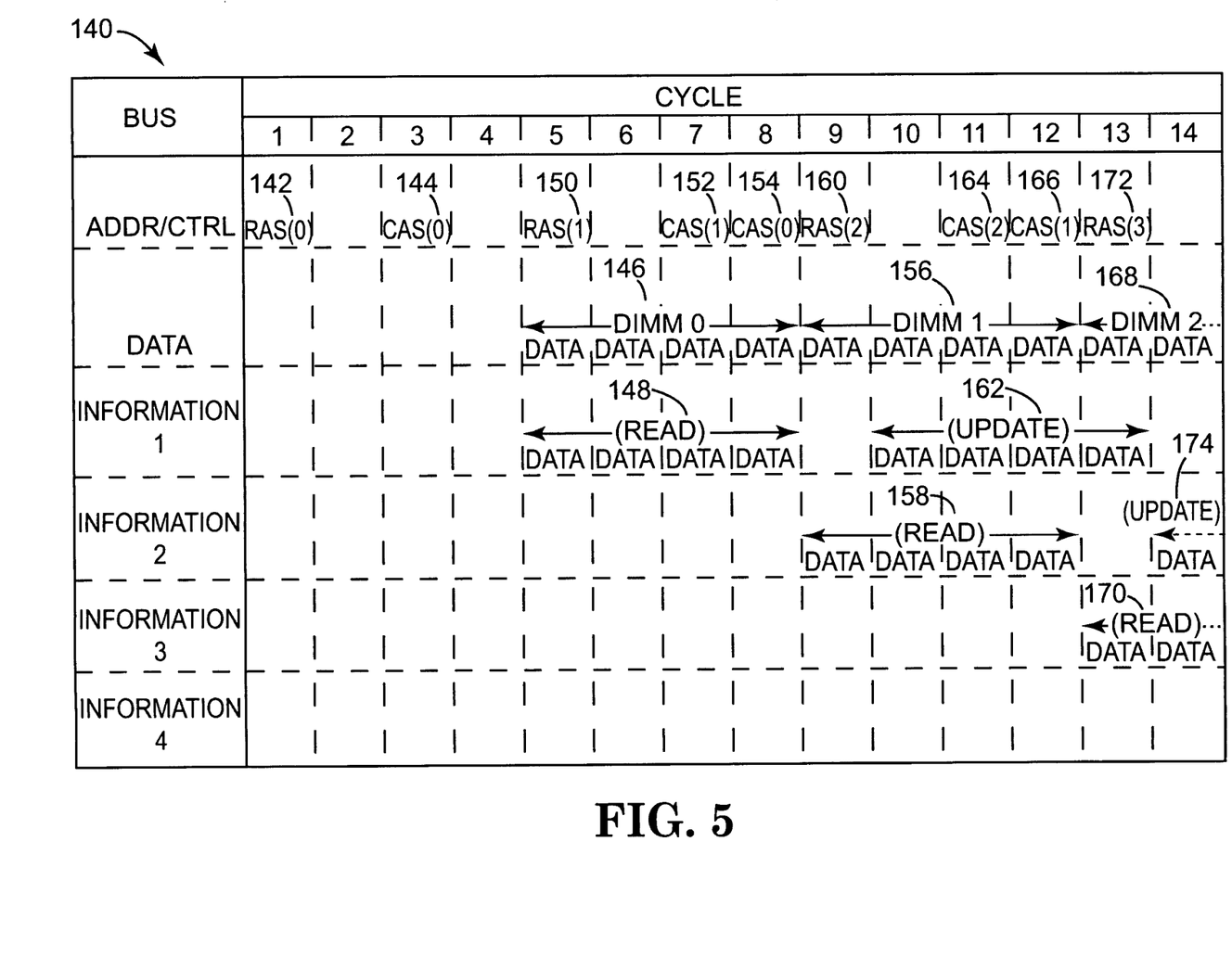
FIG. 5 is an example timing diagram illustrating the operation of a main memory system employing a directory-based cache coherency scheme according to the present invention.

FIG. 5 is an example timing diagram 140 illustrating the operation of main memory system 120 according to the present invention. When processor 32 requests a first cache line from first DIMM(0) 68, memory controller 42 at cycle 1 provides to first DIMM(0) 68 via address/control bus 124 a RAS(0) associated with the first cache line, as indicated at 142. After first DIMM(0) 68 initializes the appropriate row address during cycle 2, memory controller 42 provides to first DIMM(0) 68 via address/control bus 124 a CAS(0) associated with the first cache line, as indicated at 144. After first DIMM(0) 68 initializes the appropriate column address associated with CAS(0) during cycle 4, memory controller 42 reads during cycles 5–8 the 1,024 data bits and the 128 ECC/tag directory bits of the first requested cache line via data bus 122 and first information bus 126 as indicated at 146 and 148, respectively. After reading the first cache line, memory controller 42 computes the ECC based on the modified tag directory bits associated with the first cache line.

While the first cache line is being read via data and information buses 122 and 126 during cycles 5–8, memory controller 42 at cycle 5 provides to second DIMM(1) 70 via address/control bus 124 a RAS(1) associated with a second requested cache line, as indicated at 150. At cycle 7, after second DIMM(1) 70 initializes the appropriate row address during cycle 6, memory controller 42 provides to second DIMM(1) 70 via address/control bus 124 a CAS(1) associated with the second cache line, as indicated at 152. At cycle 8, while second DIMM(1) 70 is initializing the appropriate column address associated with CAS(1), memory controller 42 retransmits CAS(0) to first DIMM(0) 68 via address/control bus 124, as indicated at 154. After second DIMM(1) 70 initializes the appropriate column address associated with CAS(1) during cycle 8, memory controller 42 reads during cycles 9–12 the 1,024 data bits and the 128 ECC/tag directory bits of the second requested cache line via data bus 122 and second information bus 128 as indicated at 156 and 158, respectively. After reading the second cache line, memory controller 42 computes the ECC based on the modified tag directory bits associated with the second cache line.

At cycle 9, while the second requested cache line is being read via data and information buses 122 and 128 and CAS(0) is being re-initialized by first DIMM(0) 68, memory controller 42 provides a RAS(2) associated with a third requested cache line to third DIMM(2) 72 via address/control bus 124 as indicated at 160. After first DIMM(0) 68 reinitializes the appropriate column address associated with CAS(0), memory controller 42 writes the updated ECC and tag directory bits to first DIMM(0) 68 via first information bus 126 as indicated at 162.

After third DIMM(2) 72 initializes the appropriate row address associated with RAS(2) during cycle 10, memory controller 42 provides a to third DIMM(2) 72 via address/control bus 124 a CAS(2) associated with the third cache line, as indicated at 164. At cycle 12, while third DIMM(2) 72 is initializing the appropriate column address associated with CAS(2), memory controller 42 retransmits CAS(1) to second DIMM(1) 70 via address/control bus 124, as indicated at 166. After third DIMM(2) 72 initializes the appropriate column address associated with CAS(2) during cycle 12, memory controller 42 begins reading at cycle 13 the 1,024 data bits and the 128 ECC/tag directory bits of the third requested cache line via data bus 122 and third information bus 130 as indicated at 168 and 170, respectively.

At cycle 13, while the third requested cache line is being read via data and information buses 122 and 130 and CAS(1) is being re-initialized by second DIMM(1) 70, memory controller 42 provides a RAS(3) associated with a fourth cache line to fourth DIMM(3) 74 via address/control bus 124 as indicated at 172. After second DIMM(1) 70 reinitializes the appropriate column address associated with CAS(1), memory controller 42 writes the updated ECC and tag directory bits to second DIMM(1) 70 via second information bus 128 as indicated at 174.

Memory controller 42 continues to read requested cache lines from and write update ECC and tag directory bits to DIMMs 68, 70, 72, and 74 in this fashion as long as processor 32 continues the process of updating the contents of cache memory 40. As evidenced by example timing diagram 140, main memory system 120 employing a directory-based cache coherency scheme according to the present invention reduces memory bandwidth loss by providing separate information buses 126, 128, 130, and 132 by which ECC and tag directory bit updates are performed. By providing separate information buses, memory system 120 according to the present invention can read one cache line, such as the cache line indicated at 156 and 158 during cycles 9–12, while simultaneously updating the ECC/tag directory bits as indicated at 162 for a previously read cache line, such as the previously read cache line indicated at 146 and 148 during cycles 5–8. By performing these operations in parallel, memory system 120 according to the present invention reduces memory bandwidth losses.

One aspect of the present invention provides an ECC scheme that supports single error correct (SEC), double error detection (DED), and correction of a chipkill in a single bus memory system, such as memory system 120. The term chipkill traditionally refers to the ability to correct multiple bit errors in memory, where the multiple bit error is the width of the memory device. For example, memory system 120 supporting a chipkill function would be able to correct a 4-bit wide error caused by a failure of any one of the 4-bit wide RAMS of DIMMs 68, 70, 72, or 74. Thus, the failure of any one 4-bit wide RAM would not cause the memory system 120 to fail.

To provide such an ECC scheme, typical memory schemes involve combining multiple DIMMs into one memory bus. For example, certain high end chipsets combine four DIMMs into a 144-bit bus that includes 128 data bits and 16 ECC bits. The number of bits that can be corrected typically depends on the number of ECC bits supported by the memory system. Error correction code refers to a commonly used error detection and correction process that is generally based on a cyclic redundancy code (CRC) algorithm. CRC algorithms work such that data received in the form of an ECC code word, which comprises data bits and appended CRC bits, is exactly divisible by a CRC polynomial. If the ECC code word is not divisible by the CRC polynomial, an error is deemed to have occurred.

Figure 6:
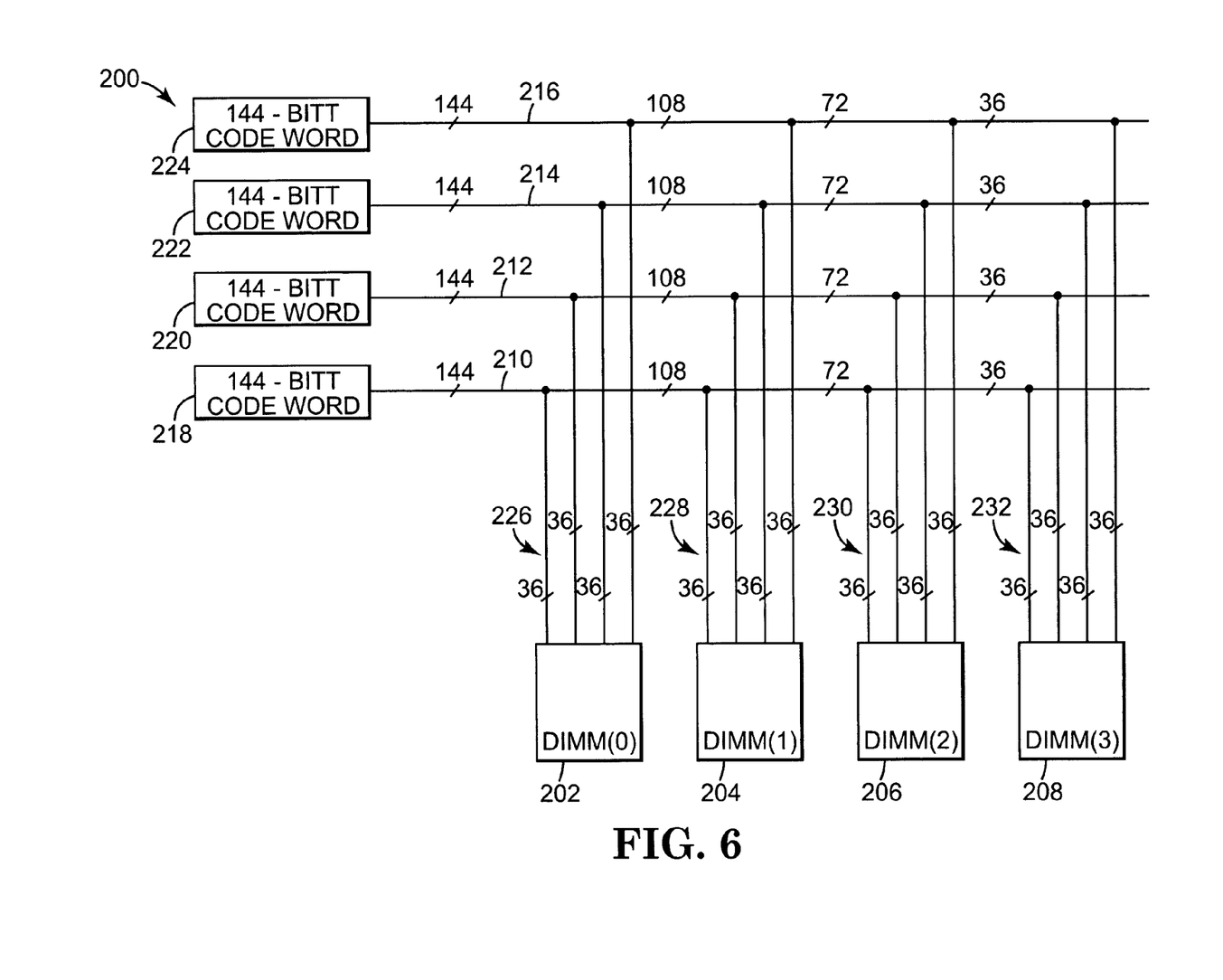
FIG. 6 is a block diagram and schematic diagram illustrating a conventional main memory error correction code scheme.

FIG. 6 is block diagram illustrating an example of a conventional memory system 200 using multiple memory buses to provide an ECC scheme that supports chipkill. Conventional memory system 200 includes a first DIMM(0) 202, a second DIMM(1) 204, a third DIMM(2) 206, and a fourth DIMM(3) 208, wherein each of the four DIMMs includes 36 4-bit wide RAMs. Conventional memory system 200 further includes four 144-bit wide memory buses 210, 212, 214, and 216, with each providing a 144-bit ECC code word 218, 220, 222, and 224, respectively, wherein each code word comprises 128 data bits and 16 ECC bits. Each bit of the four bits of each RAM of DIMMs 202, 204, 206, and 208 contributes to a different code word. In other words, one bit of each of the 36-RAMs of DIMMs 202, 204, 206, and 208 is coupled to each of the four 144-bit wide memory buses 210, 212, 214, and 216. Thus, each DIMM 202, 204, 206, and 208 is coupled to each of the four 144-bit wide memory buses 210, 212, 214, and 216 via a 36-bit wide memory bus as indicated at 226, 228, 230, and 232, respectively.

The four memory buses 210, 212, 214, and 216 provide simultaneous access to 576-bits from the four DIMMS 202, 204, 206, and 208. With 128-data bits per ECC code word, conventional memory system 200 requires 2-cycles to retrieve a 128-byte cache line. A standard ECC code, such as a Hamming/Hsiao code, provides SEC-DED at each of the four ECC code 144-bit code words 218, 220, 222, and 224. Chipkill is supported because each bit of each RAM of DIMMs 202, 204, 206, and 208 goes to a different ECC code word. Consequently, a RAM failure appears as a single-bit failure in each of the ECC code words and can thereby be corrected.

While a conventional memory scheme, such as that illustrated by conventional memory system 200, supports SEC, DED and chipkill, it possesses several undesirable characteristics. First, it requires a 576-bit wide bus to access a cache line, resulting in an integrated circuit having a large number of pins and a corresponding increase in cost. Second, since four DIMMs are accessed to retrieve a cache line, memory must be added in quad-DIMM increments. Third, memory bandwidth is potentially wasted as every memory read may be followed by a tag directory update. Finally, certain efficient memory access schemes such as BL4 may be wasteful to support because such a scheme would fetch 256-bytes rather than the 128-byte cache line size.

By configuring the RAMS of each the DIMMs 68, 70, 72, and 74 such that certain RAMS are designated to store data bits and others are designated to store information bits, and by utilizing a suitable ECC scheme, one embodiment of memory system 120 according to the present invention provides an ECC scheme that supports SEC, DED, and chipkill while simultaneously alleviating or eliminating each of the disadvantages associated with typical memory systems.

Figure 7:
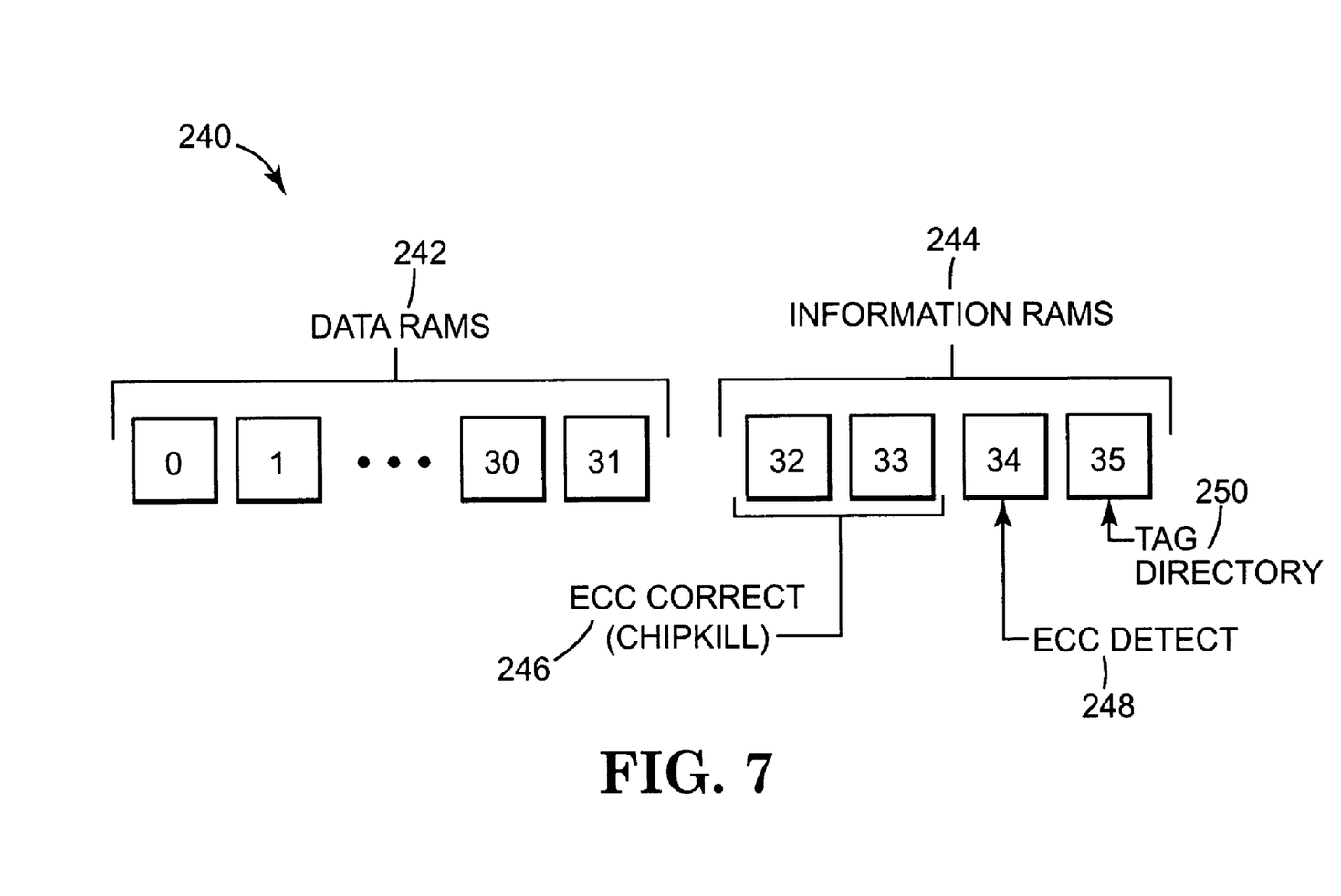
FIG. 7 is an illustrative diagram of an example embodiment of a RAM configuration to support an error correction code scheme according to the present invention.

FIG. 7 is an illustrative diagram of one example embodiment of a RAM configuration 240 that can be utilized for each DIMM of main memory unit 46 of main memory system 120 to support one embodiment of a suitable ECC scheme. RAM configuration 240 includes a total of 36 4-bit wide (DDR) RAMs with RAMs 0–31 configured to store 128 data bits, as indicated at 242, and RAMs 32–35 configured to store information bits, as indicated at 244. Two information RAMs 246 are configured to store ECC bits to provide chipkill for correction of a single RAM failure among the 36 RAMs and for SEC, one information RAM 248 is configured to store ECC bits to provide DED, and one information RAM 250 is configured to store tag directory bits.

Typically, the number of ECC bits required for chipkill functionality is dependent on the width of the memory chip and the ECC algorithm that is used. Standard ECC schemes typically require each of the 36 4-bit wide RAMs of RAM configuration 240 to contribute at least 5 bits to an ECC code word to enable correction of a single RAM failure. In one embodiment employing DDR RAMs, each RAM contributes 8 bits, thereby providing an ECC code word comprising 288-bits (36×8). The 288-bit ECC code word in conjunction with the 16 ECC bits of RAMs 246 is sufficient to support chipkill functionality utilizing standard ECC schemes. In one embodiment, RAM configuration 240 can be altered to enable the ECC scheme to further support detection of a double-RAM failure by partitioning the bits of information RAMs 248 between ECC bits for DED and double-RAM failure, and tag directory bits.

It should be noted that while the above description of the ECC scheme is in terms of a 36-RAM DIMM, a 128-byte cache line size, and (DDR) RAMs, the principles apply to any variant of DIMM size (employing any suitable quantity of RAMs having any suitable bit-width and data transfer rate), cache line size, and memory technology.

In conclusion, by allowing a memory controller to simultaneously read a first cache line while and update a directory tag of a previously read second cache line, one embodiment of main memory system 120 according to the present invention provides a directory-based cache coherency scheme that reduces memory system bandwidth loss associated with tag updates as performed by typical directory-based cache coherency schemes. Furthermore, one embodiment of main memory system 120 provides an error correction code scheme that supports single error correction, double error detection, and chipkill in a single-bus memory system while supporting additions of memory in one DIMM increments.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A memory system employing a directory-based cache coherency scheme, the memory system comprising:
   a memory unit comprising a plurality of memory modules, each memory module storing a plurality of cache lines, with each cache line comprising a plurality of data bits and a plurality of informational bits;
   a common data bus coupled to all of the memory modules and configured to read/write data bits from/to all of the memory modules;
   a plurality of information buses, each information bus coupled to a corresponding one of the memory modules and configured to read/write informational bits of cache lines from/to its corresponding memory module; and
   a memory controller controlling access to the memory unit, the memory controller configured to read a plurality of data bits and a plurality of information bits of a first cache line from a first memory module via the common data bus and the information bus corresponding to the first memory module, and in a parallel operation to write a plurality of informational bits of a second cache line to a second memory module via the information bus corresponding to the second memory module.

2. The memory system of claim 1, wherein the plurality of informational bits of each cache line comprises:
   directory tag bits.

3. The memory system of claim 1, wherein the plurality of informational bits of each cache line comprises:
   error correction code (ECC) bits.

4. The memory system of claim 1 wherein the memory unit comprises a plurality of dual in-line memory modules (DIMMs).

5. The memory system of claim 4, wherein each DIMM comprises:
   a plurality of random access memory (RAM) devices.

6. The memory system of claim 5, wherein the plurality of RAM devices further comprises:
   a sub-plurality of RAM devices for storing data bits;
   a sub-plurality of RAM devices for storing ECC bits;
   a sub-plurality of RAM devices for storing directory tag bits.

7. The memory system of claim 1, further comprising:
   an address/control bus coupled between each of the memory modules and the controller.

8. The memory system of claim 7, wherein the address/control bus comprises:
   a plurality of ECC/tag control lines, one coupled to each memory module; wherein a ECC/tag control line is configured to enable/disable the ability of ECC and directory tag bits to be written to its corresponding memory module.

9. A computer system comprising:
   a system bus;
   a microprocessor coupled to the system bus and including a cache memory; and
   a main memory system employing a directory-based cache coherency scheme coupled to the system bus, configured to store a plurality of cache lines, and configured to transfer to and from the cache memory a plurality of cache lines requested by the microprocessor, the main memory system comprising:
     a memory unit comprising a plurality of memory modules, each memory module storing a plurality of cache lines, each cache line comprising a plurality of data bits and a plurality of informational bits;
     a common data bus coupled to all of the memory modules and configured to read/write data bits from/to all of the memory modules;

a plurality of information buses, each information bus coupled to a corresponding one of the memory modules and configured to read/write informational bits of cache lines from/to its corresponding memory module; and a memory controller controlling access to the memory unit, the memory controller configured to read a plurality of data bits and a plurality of informational bits of a first requested cache line from a first memory module via the common data bus and the information bus corresponding to the first memory module, and in a parallel operation to write a plurality of informational bits of a second requested cache line to a second memory module via the information bus corresponding to the second memory module.

10. The computer system of claim 9, wherein the plurality of informational bits of each cache line comprises:
directory tag bits.

11. The computer system of claim 9, wherein the plurality of informational bits of each cache line comprises:
error correction code (ECC) bits.

12. The computer system of claim 9 wherein the memory unit comprises a plurality of dual in-line memory modules (DIMMs).

13. The computer system of claim 12, wherein each DIMM comprises:
a plurality of random access memory (RAM) devices.

14. The computer system of claim 13, wherein the plurality of RAM modules further comprises:
a sub-plurality of RAM devices for storing data bits;
a sub-plurality of RAM devices for storing ECC bits;
a sub-plurality of RAM devices for storing directory tag bits.

15. The computer system of claim 9, further comprising:
an address/control bus coupled between each of the memory modules and the controller.

16. The computer system of claim 15, wherein the address/control bus comprises:
a plurality of ECC/tag control lines, one coupled to each memory module; wherein each ECC/tag control line is configured to enable/disable the ability of ECC and directory tag bits to be written to its corresponding memory module.

17. A method of updating a tag directory in a memory system employing a directory-based cache coherency scheme, the method comprising:
providing a memory unit comprising a plurality of memory modules each storing a plurality of cache lines, with each cache line comprising a plurality of data bits and a plurality of informational bits;
providing a common data bus coupled to all of the memory modules and configured to read/write data bits from/to all of the memory modules;

providing a plurality of information buses, each information bus coupled to a corresponding one of the memory modules and configured to read/write informational bits of cache lines from/to its corresponding memory module; and reading from a first memory module a plurality of data bits and a plurality of informational bits of a first cache line via the common data bus and the information bus corresponding to the first memory module, and simultaneously writing a plurality of informational bits of a second cache line to a second memory module via the information bus corresponding to the second memory module.

18. The method of claim 17, further comprising:
providing a memory unit comprising a plurality of dual in-line memory modules (DIMMs).

19. The method of claim 18, further comprising:
providing DIMMs comprising a plurality of random access memory (RAM) devices.

20. The method of claim 19, further comprising:
partitioning the plurality of RAM devices to form a sub-plurality of RAM devices for storing data bits, a sub-plurality of RAM devices for storing ECC bits, and a sub-plurality of RAM devices for storing directory tag bits.

21. The method of claim 17, further comprising:
providing an address/control bus coupled to each memory module.

22. The method of claim 17, further comprising:
providing as part of the address/control bus a plurality of ECC/tag control lines, one coupled to each memory module, wherein each ECC/tag control line is configured to enable/disable the ability of ECC and directory tag bits to be written to its corresponding memory module.

23. A method of controlling memory access in a memory system employing a directory-based cache coherency scheme, the method comprising:
reading from a first memory module of a memory unit a plurality of data bits of a first cache line via a memory bus and a plurality of informational bits of the first cache line via a first information bus coupled only to the first memory module, and simultaneously writing to a second memory module of the memory unit a plurality of informational bits of a second cache line via a second information bus coupled only to the second memory module, wherein the data bus coupled to and shared by the first and second memory modules.

* * * * *